Dec. 3, 1929. S. TROLLE 1,737,814
SUPPORTING BRACKET FOR VISOR GLASSES
Filed April 9, 1928

Inventor:
Sofus Trolle

Patented Dec. 3, 1929

1,737,814

UNITED STATES PATENT OFFICE

SOFUS TROLLE, OF RACINE, WISCONSIN, ASSIGNOR TO TROLLE SPECIALTY COMPANY, A CORPORATION OF WISCONSIN

SUPPORTING BRACKET FOR VISOR GLASSES

Application filed April 9, 1928. Serial No. 268,703.

This invention relates to supporting brackets for visor glasses.

Objects of this invention are to provide a novel form of visor glass supporting bracket for windows, particularly automobile windows, which is so constructed that the brackets may be positioned within the casing of the window and securely retained in place without the use of nails, screws, or other fastening means, and which are each formed from a single sheet of metal by a simple stamping operation.

Further objects are to provide a visor glass attachment for an automobile window, which is so constructed that it has a pleasing and attractive appearance, may be easily assembled and positioned within the window casing, and which holds the visor glass against rattling.

An embodiment of the invention is shown in the accompanying drawings in which.

Figure 4:
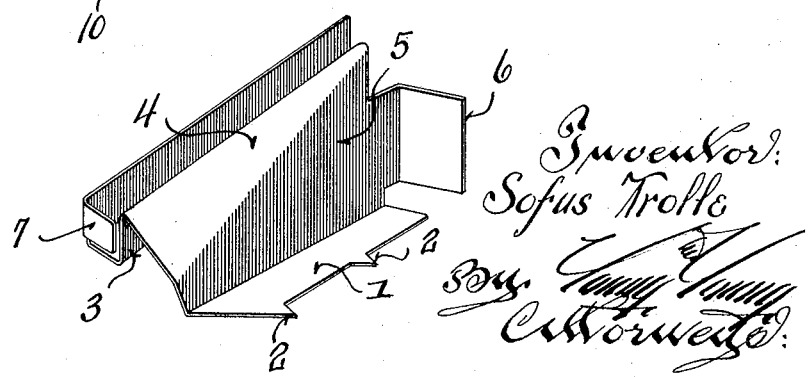
Figure 4 is a perspective view of one of the brackets.

Referring to the drawings, particularly Figure 4, it will be seen that the bracket comprises a side strip 1 provided with a pair of prongs 2 and having a channelled portion 3 connected to the side strip 1 by means of a transverse, triangularly-shaped web 4, and a web 5 of trapezoidal shape, as shown particularly in Figure 4. Further, this bracket is provided with a transversely bent upper plate 6, and a channelled portion 3 is provided with a lower tongue 7.

Figure 2:
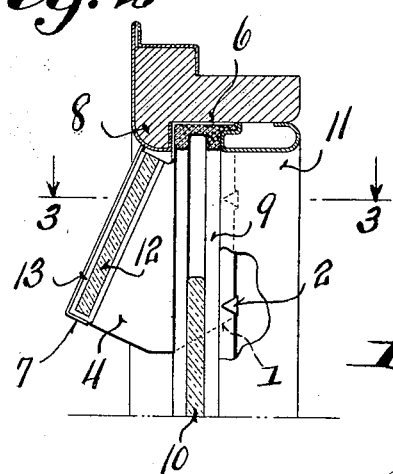
Figure 2 is a sectional view on the line 2—2 of Figure 1.
Figure 3:
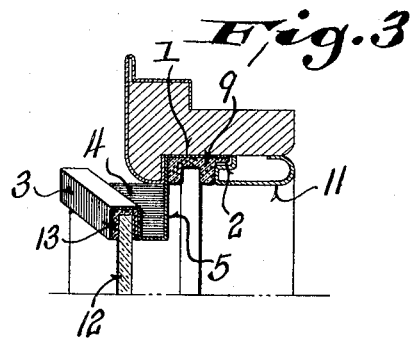
Figure 3 is a view on the line 3—3 of Figure 2.

In using the bracket, the side strip 1 is arranged vertically within the window casing, as may be seen from Figures 2 and 3. This side strip is mounted directly rearwardly of the front stop 8 of the window casing and is positioned behind the felt or other yielding packing 9 which slidably carries the glass panel 10 for the window. The upper plate 6 is slipped in between the window casing and the upper packing strip, as shown in Figure 2. After the brackets are positioned on opposite sides of the window casing, the tongues 2 are bent inwardly, as shown in Figure 2, over the edge of the yielding packing or strip 9. Thereafter, the rear stop 11 of the window casing is repositioned. A glass visor panel 12 is carried between the channel members 3 and its ends are preferably enclosed by a yielding packing 13 to prevent rattling or chipping of the glass. The upper edge of the glass visor is also covered by any sort of yielding packing strip, such as indicated at 14. Preferably, this strip is channel shape, so as to retain itself in place upon the upper edge of the visor glass or panel.

Figure 1:
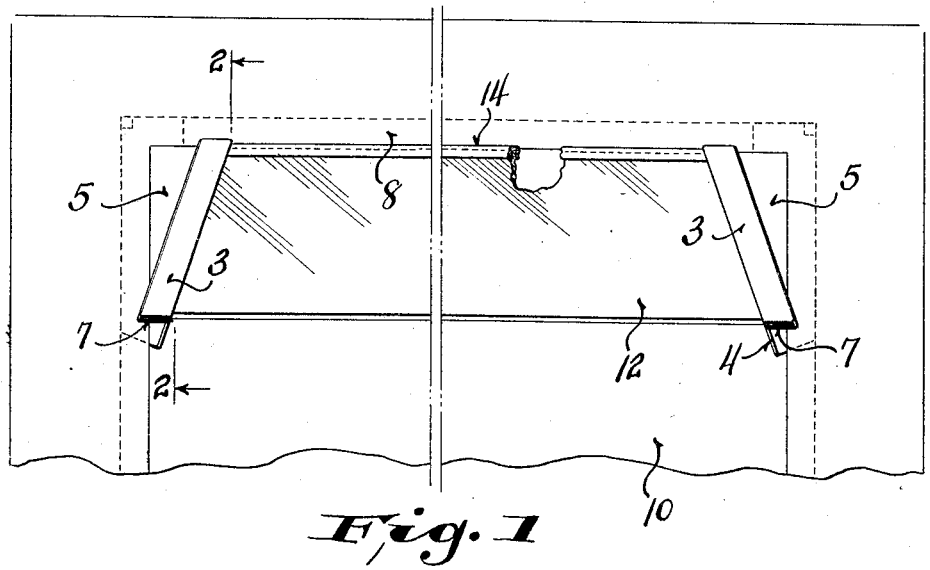
Figure 1 is a view from the outer side of the upper portion of an automobile window.

It is also preferable to so shape the webs 4 and 5 that the channel members 3 extend downwardly and outwardly and also extend laterally with respect to the side strips 1. This gives a very pleasing appearance to the visor, as is obvious from an inspection of Figure 1, and from Figures 1 and 2 it is apparent that the visor slants downwardly and outwardly, and also slants laterally outwardly at its ends.

These brackets may be very cheaply stamped from sheet metal with a minimum of expense and may be easily positioned within an automobile or similar window casing.

Further, the glass visor panel is securely held against rattling or chipping and is held also against downward slipping by the lower tongue 7. Preferably, the packing 13 passes beneath the lower edge of the glass as is apparent from an inspection of Figure 2.

Although the invention has been described in considerable detail, such description is intended as illustrative rather than limiting as the invention may be variously embodied and as the scope of such invention is to be determined as claimed.

I claim:

1. A bracket for a visor glass for a window comprising a vertical side strip, and a channelled glass-receiving portion slanting outwardly, laterally, and downwardly with reference to said side strips, all portions of said bracket being integral, said channelled portion having an inwardly turned bottom lip and said side strip having tongues on its marginal edge remote from said channelled portion.

2. A bracket for a visor panel for a window comprising a side strip, a top plate at an angle to said side strip, a web extending outwardly from said side strip, and a channelled, panel receiving portion carried by said web.

3. The combination of a window casing having top and side strips, a pair of brackets located on opposite sides of said window casing, said brackets having side strips and a top plate positioned between said casing and the first mentioned side strips and top strip respectively, said brackets having panel receiving channels, and a panel having its ends carried within said channels, the side and top strip of said window casing holding said brackets against motion in any direction.

4. A bracket for a visor panel comprising a side strip, spaced bendable prongs carried by said strip, a top plate at an angle to said side strip, a web extending outwardly from said side strip, and a channelled panel receiving portion carried by said web.

5. A bracket for a visor panel comprising a side strip, fastening means carried by said strip, a top plate at an angle to said side strip, a web extending outwardly from said side strip, a second web extending laterally from the first web and a channelled panel receiving portion carried by the second web.

6. A bracket for the visor panel comprising a side strip, fastening members carried by said strip, a top plate at an angle to said side strip, a web extending outwardly from the side strip and integral with the top plate and strip, a second web extending at an angle and integral with the first web, a channelled panel receiving portion carried by the second web and a laterally disposed tongue at one end of the channelled portion to support a panel therein.

In testimony that I claim the foregoing I have hereunto set my hand at Racine, in the county of Racine and State of Wisconsin.

SOFUS TROLLE.